(12) United States Patent
Kim

(10) Patent No.: US 6,550,354 B2
(45) Date of Patent: Apr. 22, 2003

(54) FOOT BRAKE RELEASE DEVICE

(75) Inventor: Taeg-Jo Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 19 days.

(21) Appl. No.: 09/738,779

(22) Filed: Dec. 15, 2000

(65) Prior Publication Data

US 2001/0003928 A1 Jun. 21, 2001

(30) Foreign Application Priority Data

Dec. 16, 1999 (KR) .......................... 1999-58232

(51) Int. Cl.$^7$ ................................ G05G 5/06
(52) U.S. Cl. ........................ 74/512; 74/501.5
(58) Field of Search .................. 74/512, 513, 539, 74/501.5

(56) References Cited

U.S. PATENT DOCUMENTS

| | | | | |
|---|---|---|---|---|
| 3,487,716 A | * | 1/1970 | Hirst et al. ................... | 74/437 |
| 3,693,472 A | * | 9/1972 | Hirst et al. ................... | 74/518 |
| 3,839,924 A | * | 10/1974 | Schaefer ...................... | 74/517 |
| 4,281,736 A | * | 8/1981 | Lizzio ......................... | 180/271 |
| 4,570,508 A | * | 2/1986 | Nicholson et al. ............. | 74/142 |
| 4,612,823 A | * | 9/1986 | De Leeuw et al. ............. | 74/533 |
| 4,841,798 A | * | 6/1989 | Porter et al. ................. | 74/501.5 R |
| 5,211,072 A | * | 5/1993 | Barlas et al. ................. | 74/512 |
| 5,467,666 A | * | 11/1995 | Soucie et al. ................. | 74/512 |
| 5,546,828 A | * | 8/1996 | Golarz ........................ | 74/512 |
| 5,555,773 A | * | 9/1996 | Nanno et al. ................. | 74/512 |
| 5,588,335 A | * | 12/1996 | Strait ......................... | 74/512 |
| 5,649,453 A | * | 7/1997 | Kanbe ......................... | 74/512 |
| 5,775,174 A | * | 7/1998 | Kanbe et al. ................. | 74/535 |
| 5,832,784 A | * | 11/1998 | McCallips et al. ............ | 74/512 |
| 6,105,459 A | * | 8/2000 | Troiano ....................... | 74/512 |
| 6,289,766 B1 | * | 9/2001 | Sukeshita et al. ............. | 74/512 |

* cited by examiner

Primary Examiner—David A. Bucci
Assistant Examiner—Julie K. Smith
(74) Attorney, Agent, or Firm—Christie, Parker & Hale, LLP

(57) ABSTRACT

A foot brake release device adapted such that a slight and instant pull of a parking release knob for releasing a parking activated state for a parking brake pedal enables the complete release of the parking activated state of the parking brake pedal. The device includes a parking brake pedal equipped at one side thereof with a ratchet gear; a ratchet plate equipped with a ratchet gear meshed to a ratchet gear; a torsion spring mounted at the ratchet plate allowing the parking brake pedal to rotate at a predetermined angle for maintenance of a locked state and to restrict the ratchet plate from rotating in one direction; and a torsion spring slack keeping unit for maintaining a slacked state of the torsion spring when the parking brake pedal is returned for rotation.

4 Claims, 5 Drawing Sheets

FOOT BRAKE RELEASE DEVICE

CROSS-REFERENCE TO RELATED APPLICATION

This application claims priority of Korea patent Application No. 99-58232, filed on Dec. 16, 1999.

BACKGROUND OF THE INVENTION

1. Field of the Invention

The present invention relates to a foot brake, and more particularly to a release device of a foot brake adapted to completely release a parked state of the foot brake just by instantly pulling a parking release knob, thereby removing inconvenience of separately checking whether the parking state is completely released and promoting a safe operation of an automobile.

2. Description of the Prior Art

Generally, a parking brake of an automobile serves to brake rear wheels for maintaining a braked state when the automobile is parked, and a parking brake according to the prior art is operated to brake an automobile by adhering a parking brake shoe at the rear wheels to a parking brake drum when an operator pulls a parking brake manipulating lever, at which time, frictional force generated therefrom brakes the automobile.

Meanwhile, besides the hand brake thus described, a foot parking brake for braking an automobile by applying pressure by foot is disclosed. A foot parking brake according to the prior art is depicted in FIGS. 1, 2 and 3, where a floor panel near a driver is mounted with an installation panel 2 on which a parking brake pedal 1 is rotatively hinged thereto, and the parking brake pedal 1 is connected at one tip end thereof to one tip end of a parking brake cable 7.

The parking brake pedal 1 is formed at one side thereof with a ratchet gear 3, and a ratchet plate 5 meshes with the ratchet gear and is rotatively supported to the installation plate 2 via a rotary axle 5a.

Furthermore, the ratchet plate 5 is rotatively supported at the rotary axle 5a thereof by one side of a release lever 17, while the release lever 17 is connected at the other end thereof to one end of a parking release cable 9. The parking release cable 9 is mounted at the other end thereof with a parking release knob 9a for a driver to manipulate.

The ratchet plate 5 is wound with a torsion spring 11 while the torsion spring 11 is fixed at one end thereof to a bracket 2a of the installation plate 2.

Furthermore, between a predetermined area of the installation plate 2 and the parking brake pedal 1 there is formed a pedal damper 19 for softening the shock when the parking brake pedal 1 is pressed or released. The pedal 1 is connected to a return spring 13 while the ratchet plate 5 is connected to another return spring 15.

When a drive steps on the parking brake pedal 1 for parking an automobile, the pedal 1 is rotated via a hinge toward an arrow "A" direction in FIG. 2 (counterclockwise) whereby, the parking brake cable 7 connected to the pedal 1 is pulled to cause a rear parking brake shoe to adhere to a parking brake drum and to allow a parking brake to actuate.

At this time, the parking brake can maintain the actuated state as long as the parking brake pedal 1 keeps a counterclockwise rotating state, the role of which is taken care of by the torsion spring 11.

In other words, when the parking brake pedal 1 is rotated counterclockwise by manipulation of a driver while the ratchet gear 3 of the parking brake pedal 1 is meshed with ratchet gear of the ratchet plate 5, the torsion spring 11 wound around the ratchet plate 5 is slackened. However, when the parking brake pedal 1 is freed by the driver, the parking brake pedal 1 tends to rotate clockwise by the return spring 13, at which time, the torsion spring 11 is wound by rotation of the ratchet plate 5. When the torsion spring 11 is wound to a predetermined level, the spring 11 can no longer be wound, which causes the ratchet plate 5 to be locked and also makes the parking brake pedal 1 meshed to the ratchet plate 5 locked, whereby the parking brake pedal 1 keeps maintaining the counterclockwise rotated state.

Meanwhile, in releasing the parking brake, the driver pulls the parking release knob 9a to allow the release lever 17 to rotate via the parking release cable 9 connected to the parking release knob 9a, whereby a protruder 17b formed at an extension 17a of the release lever 17 pushes a free end 11b of the torsion spring 11 to slacken the wound torsion spring 11 to a predetermined length. By this, the ratchet plate 5 and the parking brake pedal 1 are freed from the torsion spring 11 to return to original position via respective return springs 15 and 13.

However, there is a problem in the releasing operation of the foot brake according to the prior art thus described in that torsion spring's pushing state of free end 11b by the release lever 17 should be kept for a predetermined period of time while the parking release is actuated to smoothly turn the ratchet plate 5 and the parking brake pedal to a rotatable state, but if the driver pulls and instantly releases the parking release knob 9a, the parking brake pedal 1 cannot be completely returned to rotation due to locking operation of the torsion spring, thereby enabling an automobile to run even while the parking brake is actuated.

Particularly, there is another problem in that viscosity of oil in damper in cold weather gets reduced, making a driver pull the parking release knob for a long time.

The present invention is disclosed to solve the aforementioned problems and it is an object of the present invention to provide a foot brake release device adapted to completely release a parking actuated state of a parking brake pedal just by instantly pulling a parking release knob for releasing the parking actuated state of the parking brake pedal, thereby removing inconvenience of separately checking whether the parking actuated state is completely released and promoting a safe operation of an automobile.

SUMMARY OF THE INVENTION

In accordance with the object of the present invention, there is provided a foot brake release device, the device comprising:

a parking brake pedal equipped at one side thereof with a ratchet gear and mounted rotatively;

a ratchet plate equipped with a ratchet gear meshed to a ratchet gear and mounted rotatively;

a torsion spring mounted at the ratchet plate for the parking brake pedal to rotate at a predetermined angle for maintenance of a locked state and to restrict the ratchet plate from rotating in one direction; and torsion spring slack keeping means for maintaining slacked state of the torsion spring when the parking brake pedal is returned for rotation, wherein the torsion spring slack keeping means further comprises:

a hinge member;

a lock lever mounted with a first bend rotatively connected to the hinge member and contactable to the ratchet plate, and a second bend extended to contact a free end of the torsion spring; and resilient member mounted at the lock lever for resiliently supporting the lock lever.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, preferred embodiment of the present invention will be described in detail with reference to the accompanying drawings.

Figure 1:
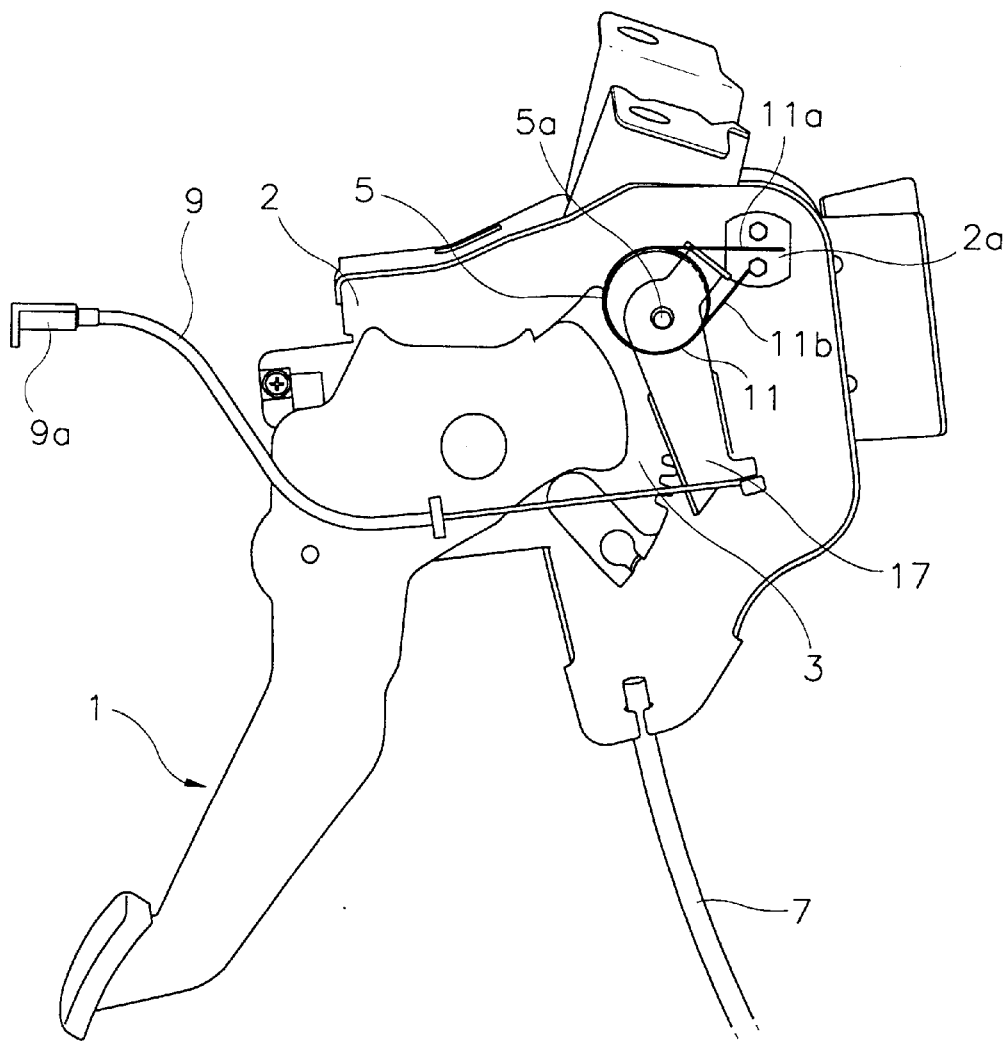
FIG. 1 is a lateral view for illustrating a foot brake device according to the prior art.
Figure 2:
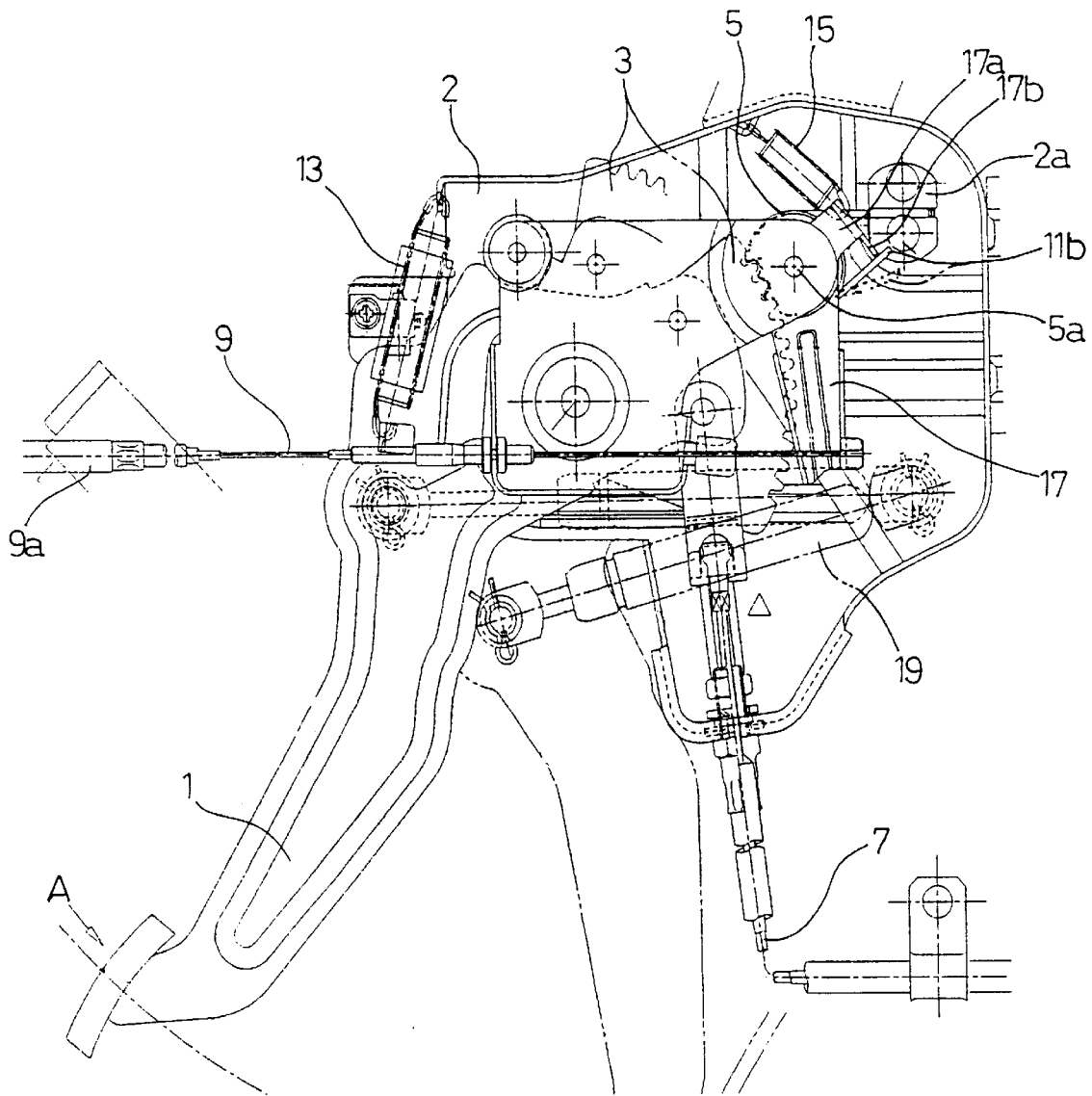
FIG. 2 is a lateral view for illustrating an operating state of the foot brake device in FIG. 1.
Figure 3:
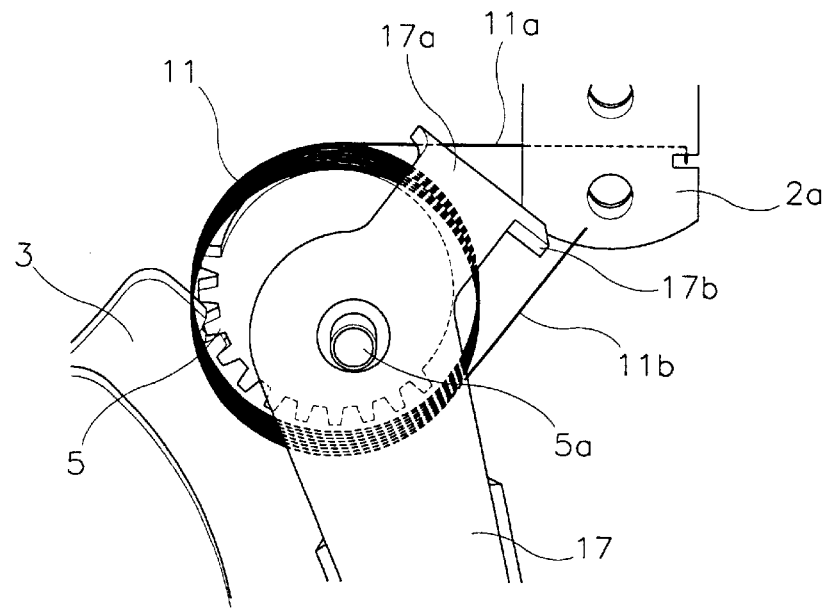
FIG. 3 is a perspective view for illustrating an arrangement of principal parts for parking release in FIG. 1.
Figure 5:
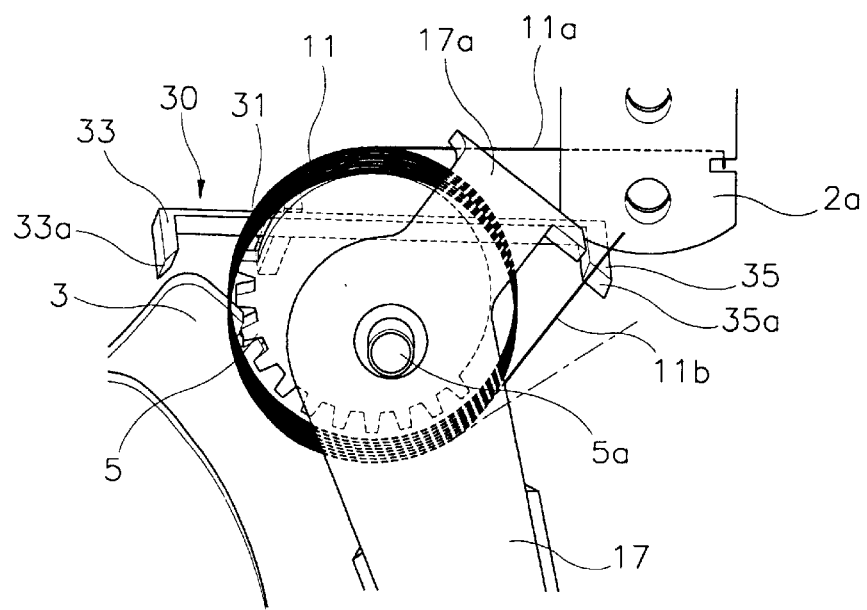
FIG. 5 is a perspective view for illustrating an arrangement of principal parts for parking release in FIG. 4.
Figure 4:
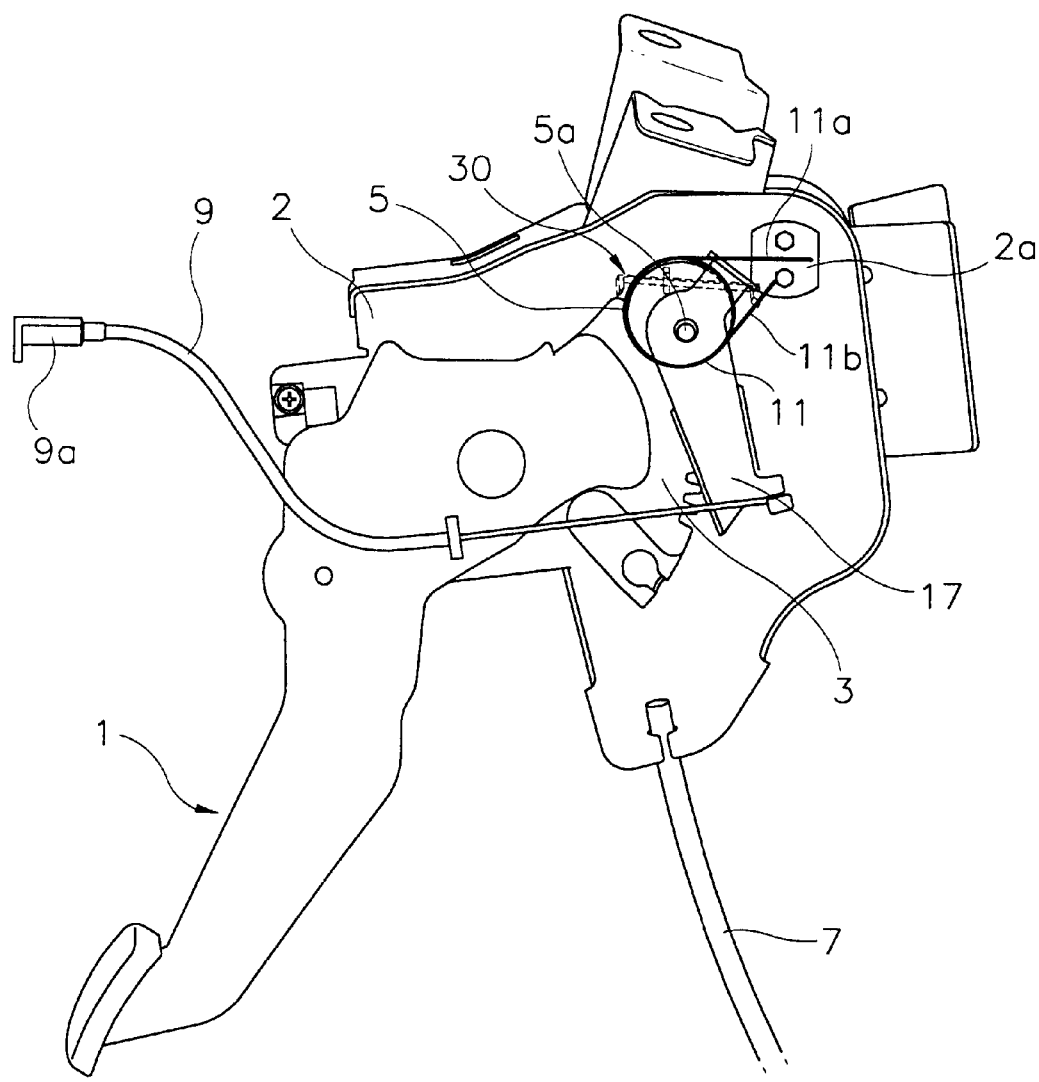
FIG. 4 is a lateral view for illustrating a foot brake device according to the present invention.
Figure 6:
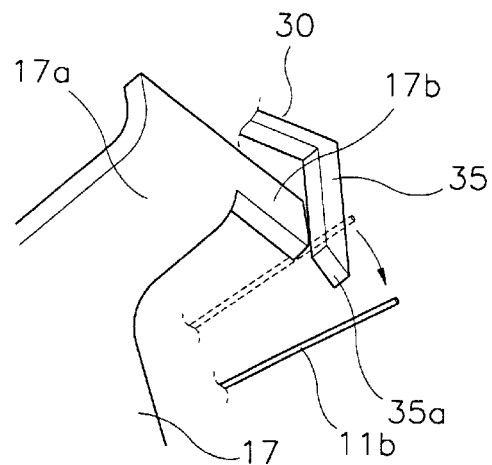
FIG. 6 is a constitutional drawing for illustrating a parking release operation of principal parts in FIG. 5.
Figure 7:
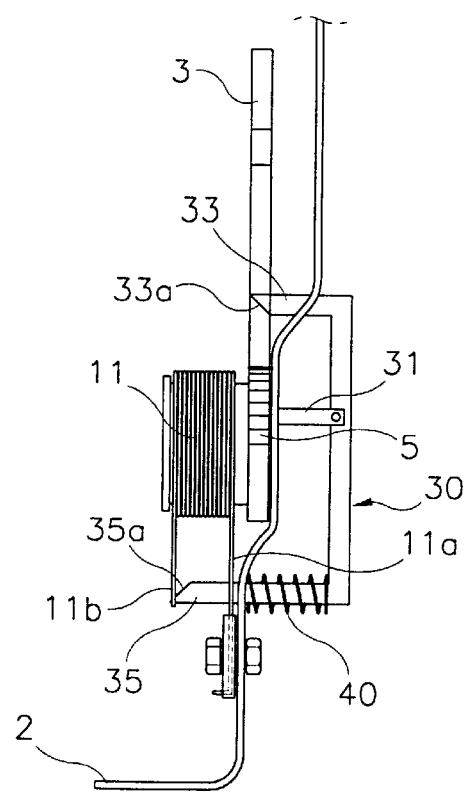
FIG. 7 is a schematic drawing for illustrating principal parts for releasing the parking according to one embodiment of the present invention.

FIG. 4 is a lateral view for illustrating a foot brake device according to the present invention, FIG. 5 is a perspective view for illustrating an arrangement of principal parts for parking release in FIG. 4, FIG. 6 is a constitutional drawing for illustrating a parking release operation of principal parts in FIG. 5, and FIG. 7 is a schematic drawing for illustrating principal parts for releasing the parking according to one embodiment of the present invention, where like reference numerals throughout the drawings are used for designation of like or equivalent parts or portions as in FIGS. 1, 2 and 3 for simplicity of illustration and explanation, and redundant explanation thereto will be omitted.

As illustrated in the drawings, the foot brake release device according to the present invention further includes a torsion spring slack keeping means for maintaining a slacked state of the torsion spring 11 until the parking release knob is manipulated by a driving to allow the braking brake pedal 1 and the ratchet plate 5 to be completely returned via respective return springs 13 and 15.

The torsion spring slack keeping means includes a hinge member 31 fixed to a rear surface of the installation plate 2, a lock lever 30 equipped with a first bend rotatively connected to the hinge member and contactable to the ratchet plate and a second bend 35 extended to contact free end 11b of the torsion spring 11, and a resilient member 40 mounted at the lock lever 30 for resiliently supporting the lock lever 30. Furthermore, the first and second bends 33 and 35 are oppositely formed at each end thereof with inclined parts 33a and 35a.

Now, operational effect of the present invention thus constructed will be described.

First of all, when a driver steps on the parking brake pedal 1 for parking, the parking brake cable 7 is pulled and the parking brake shoe at rear wheels adhere the parking brake drum to allow the parking brake to perform braking operation.

At this time, when the driver frees the pedal, the parking brake pedal 1 starts to rotate clockwise by return spring 13, at which time, the torsion spring 11 is wound by rotation of the ratchet plate 5. When the torsion spring 11 is wound up to a predetermined amount, it stops being wound. By this the ratchet plate 5 is locked and simultaneously the parking brake pedal 1 meshed to the ratchet plate 5 is also locked whereby, the parking brake pedal 1 maintains a counter-clockwise rotated state (locked state of parking brake).

Furthermore, when the parking release knob 9a is pulled for parking release, the free end 11b at the torsion spring 11 is pushed for the mount by the protruder 17b of the release lever 17, such that the wound torsion spring 11 is again unwound and slackened and rotative return to parking release direction is made via return springs 13 and 15 while the parking brake pedal 1 and the ratchet plate 5 are mutually meshed.

At this time, the bend 33 at the lock lever 30 touches a surface of the ratchet gear 3 according to rotation of the ratchet gear 3. The lock lever 30 is then rotated by the touch about the hinge member 31 and by this rotative movement the other bend 35 of the lock lever 30 is made to further protrude beyond the free end lib of the torsion spring 11, such that the free end lib of the torsion spring 11 is hitched by the bend 35 to thereby maintain the slacked state of the torsion spring 11.

In other words, even though the parking release knob 9a is slightly pulled for a short period of time and released, the torsion spring 11 slackened by the release lever 17 keeps maintaining the slacked state according to the bend 35 of the lock lever 30 thereby easing the parking release operation and smoothening the same as well.

Meanwhile, when the parking brake pedal 1 and the ratchet plate 5 are fully returned in rotation thereof, the bend 33 of the lock lever 30 no longer touches the ratchet gear 3, such that the lock lever 30 is returned to original position by resilient member 40 to release the torsion spring 11.

As apparent from the foregoing, there is an advantage in the foot brake release device thus described according to the present invention in that a slight and instant pull of a parking release knob for releasing the parking activated state at the parking brake pedal enables to completely release the parking activated state of the parking brake pedal, thereby removing separate inconvenient checking of full release of the parking actuated state and promoting a safe operation of an automobile.

What is claimed is:

1. A foot brake release device, the device comprising:
    a rotatably mounted parking brake pedal having at one side thereof a ratchet gear, the brake pedal moveable back and forth between a parking brake locked state and a parking brake unlocked state;
    a rotatably mounted ratchet plate having a ratchet gear meshed to the ratchet gear of the break pedal;
    a torsion spring mounted at the ratchet plate allowing the parking brake pedal to rotate at a predetermined angle, wherein the torsion spring maintains a locked state of the parking brake pedal and restricts rotation of the ratchet plate in one direction; and
    torsion spring slack keeping means for maintaining a slacked state of the torsion spring when the parking brake pedal is returned from the parking brake locked state, wherein the torsion spring slack keeping means further comprises,
a hinge member,
a lock lever mounted with a first bend rotatively connected to the hinge member and contactable to the ratchet plate,
a second bend extended to contact a free end of the torsion spring, and
a resilient member mounted at the lock lever for resiliently supporting the lock lever.

2. The device as defined in claim 1, wherein each end of respective bends at the lock lever is oppositely mounted with an inclined part.

3. The device as defined in claim 1, wherein the ratchet plate is rotatively mounted at a rotary axle thereof with one end of the release lever, and the other end of the release lever is connected to a parking release cable mounted with a parking release knob, while the release lever is formed at one end thereof with an extension part and the extension part is equipped with a protruder for slackening the torsion spring.

4. A foot brake release device, the device comprising:
a rotatably mounted parking brake pedal having at one side thereof a ratchet gear, the brake pedal moveable back and forth between a parking brake locked state and a parking brake unlocked state;
a rotatably mounted ratchet plate having a ratchet gear meshed to the ratchet gear of the break pedal;
a torsion spring mounted at the ratchet plate allowing the parking brake pedal to rotate at a predetermined angle, wherein the torsion spring maintains a locked state of the parking brake pedal and restricts rotation of the ratchet plate in one direction; and
torsion spring slack keeping means for maintaining a slacked state of the torsion spring when the parking brake pedal is returned from the parking brake locked state, wherein the torsion spring slack keeping means comprises,
a hinge member,
a lock lever having a first portion rotatably coupled to the hinge member for contacting the ratchet plate and a second portion for contacting a free end of the torsion spring, and
a resilient member mounted on the lock lever for resiliently supporting the lock lever.

* * * * *